United States Patent [19]

Chu et al.

[11] 3,904,102

[45] Sept. 9, 1975

[54] APPARATUS AND METHOD FOR SOLDERING, FUSING OR BRAZING

[75] Inventors: Tze Yao Chu, Trenton; Joseph Charles Mollendorf, Skillman, both of N.J.; Robert Christian Pfahl, Jr., Glen Ellyn, Ill.

[73] Assignee: Western Electric Company, Incorporated, New York, N.Y.

[22] Filed: June 5, 1974

[21] Appl. No.: 476,343

[52] U.S. Cl. ............ 228/180; 228/242; 228/254; 34/27; 34/77; 134/31; 134/107; 202/170
[51] Int. Cl.² ............................................ H05K 3/34
[58] Field of Search ............ 29/494, 498; 202/170; 34/27, 32, 73, 78; 134/11, 12, 31, 105, 107, 108, 109

[56] References Cited
UNITED STATES PATENTS

| | | | |
|---|---|---|---|
| 2,123,439 | 7/1938 | Savage | 134/11 |
| 3,011,924 | 12/1961 | Rand | 134/12 |
| 3,308,839 | 3/1967 | Barday | 134/107 X |
| 3,375,177 | 3/1968 | Rand | 134/12 X |
| 3,494,793 | 2/1970 | Lenz et al. | 134/21 X |
| 3,603,329 | 9/1971 | White et al. | 134/107 |
| 3,720,072 | 3/1973 | Berta et al. | 62/54 |
| 3,728,866 | 4/1973 | Layton | 34/73 |
| 3,866,307 | 2/1975 | Pfahl, Jr. et al. | 29/498 |

*Primary Examiner*—Donald G. Kelly
*Assistant Examiner*—K. J. Ramsey
*Attorney, Agent, or Firm*—Jack Schuman

[57] ABSTRACT

A primary liquid having a boiling point at atmospheric pressure at least equal to the temperature at which a soldering, fusing or brazing operation is to be performed is continuously boiled to establish a body of hot saturated primary vapor having a density greater than that of air at atmospheric pressure. A blanket of secondary vapor, having a density intermediate that of the primary vapor and the atmosphere, is floated on the body of primary vapor to reduce losses thereof to the atmosphere. The article on which the soldering, fusing or brazing operation is to be performed is passed through the body of secondary vapor into the body of primary vapor in the vessel. Primary vapor condenses on the article, the latent heat of vaporization of the condensing primary vapor heating the article to the temperature required for the soldering, fusing or brazing operation. After completion of the operation, the article is withdrawn from the body of primary vapor through the blanketing body of secondary vapor, out of the vessel and into the atmosphere where it is cooled to ambient temperature.

28 Claims, 4 Drawing Figures

APPARATUS AND METHOD FOR SOLDERING, FUSING OR BRAZING

BACKGROUND OF THE INVENTION

1. Field of the Invention

This invention relates, broadly speaking, to improved apparatus and method for soldering, fusing or brazing. More specifically, and with reference to a preferred embodiment, this invention relates to improved apparatus and method for soldering wherein the article on which a soldering operation is to be performed is heated to a temperature appropriate for the soldering operation by condensing thereon from a primary body of hot saturated vapor of a specific liquid a portion of said primary body of saturated vapor, and interposing between said primary body of saturated vapor and the atmosphere a secondary body of vapor of a second, relatively inexpensive, specific liquid, thereby to reduce or substantially eliminate losses to the atmosphere of vapors from said primary body of vapor, the method and apparatus being particularly useful for conducting a plurality of simultaneous soldering operations such as reflow soldering or wave soldering on a line of printed circuit boards.

2. Description of the Prior Art

The present invention is particularly applicable to operations such as soldering, fusing or brazing requiring the application of heat to the article upon which the operation is to be performed to raise its temperature.

Although the present invention is not to be construed as limited to soldering, its background is most readily understood in the context of soldering.

Soldering operations require that the elements to be soldered be heated to a temperature sufficiently high to melt solder thereon, the said elements being protected from oxidation during the soldering step.

Conventionally, the well-known soldering iron has been used, the elements to be soldered being provided with a coating of flux on those areas being soldered to prevent oxidation during the soldering step. The soldering iron technique is not well suited to rapid mass soldering operations in which, for example, a single printed circuit board may have many closely spaced connections to be soldered.

Numerous suggestions have been made to provide soldering methods and apparatus improving upon the conventional soldering iron technique and adapted for mass soldering requirements.

Thus, U.S. Pat. No. 3,359,132 (1967) to Wittmann discloses a process for solder-coating printed circuit boards wherein a layer of peanut oil is floated on a bath of molten solder. A circuit board, which has been provided with a coating of flux, is suspended in close proximity to the surface of the hot peanut oil and is held in such position so as to be preheated by a combination of radiation and air convection. Thereafter, the board is lowered through the layer of hot peanut oil into the molten solder bath in which soldering now takes place.

Very recently, a new development in soldering technique was placed in commercial use. In this new technique, which is the subject of pending U.S. Pat. application Ser. No. 395,310, filed Sept. 7, 1973, now U.S. Pat. No. 3,866,307 the article to be soldered (or fused or brazed) is placed in hot saturated vapors generated by continuously boiling a heat transfer liquid having selected properties including a boiling point at least equal to, and preferably above, the temperature required for the operation. Vapors condense on the article and give up their latent heat of vaporization thereby to heat the article to the required temperature for soldering (or fusing or brazing). The heat transfer liquid may be a fluorocarbon. The process can be applied to a single article, a batch of articles, or a continuous moving line of articles, and in specific applications, the process may be employed to effect mass reflow soldering or may be employed in conjunction with mass wave soldering.

The new development described in the preceding paragraph represents, in the opinion of those familiar with soldering, fusing or brazing operations, a state-of-the-art advance. In the practice of such development, however, it happens that some of the saturated vapors of the heat transfer liquid are lost to the atmosphere, where the process is open to the atmosphere. The heat transfer liquid presently employed in the practice of a preferred embodiment of this development is a fluorinated polyoxypropylene, such as that sold by E. I. DuPont de Nemours & Co. under their trademark "FREON E5," and under presently prevailing price schedules, such liquid is quite expensive. Consequently, losses of the vapors to the atmosphere represent an economic charge against the development as presently practiced and it is desirable that these losses be reduced or eliminated.

SUMMARY OF THE INVENTION

An object of this invention is to provide improved method and apparatus for heating an article to an elevated temperature at which an operation is to be performed.

Another of the objects of this invention is to provide improved method and apparatus for soldering, fusing or brazing, particularly for rapid and economical mass operations.

A further object of this invention is to provide an improved, economical high-speed soldering operation for printed circuit boards which prevents heat damage to the printed circuit boards as well as to sensitive electrical components on the printed circuit boards, and which reduces or substantially eliminates losses of relatively expensive heat transfer liquids to the atmosphere.

A specific object of this invention is to provide method and apparatus for mass reflow soldering.

Another specific object of this invention is to provide improved method and apparatus for mass wave soldering.

Other and further objects of this invention will become apparent during the course of the following description and by reference to the accompanying drawings and the appended claims.

Briefly, the foregoing objects are attained in one embodiment of the invention by providing method and apparatus wherein a primary liquid having a boiling point at least equal to the temperature at which an operation is to be performed on an article (e.g., soldering, fusing or brazing) is continuously boiled, substantially at atmospheric pressure, thereby to establish a primary body of hot saturated vapor in equilibrium with the boiling primary liquid, by maintaining a secondary body of vapor of a secondary liquid between the atmosphere and the primary body of saturated vapor, by introducing through the secondary body of vapor into the primary body of vapor the article to be subjected to such operation (e.g., soldering, fusing or brazing), and by condensing onto such article a portion of the primary body of vapor to heat the said article to the desired temperature by transfer of the heat of vaporization of the condensed primary vapors to the article, the last step being performed prior to or concurrently with the operation (e.g., soldering, fusing or brazing). More specifically, when soldering electrical components to a printed circuit board, a non-conducting, chemically stable and inert primary liquid having an atmospheric boiling point at least equal to soldering temperature is chosen. The vapors of the primary liquid are non-oxidizing. The secondary liquid has a lower boiling point than the primary liquid, does not form an azeotrope with the primary liquid, and does not support a high equilibrium moisture content.

BRIEF DESCRIPTION OF THE DRAWINGS

Referring now to the drawings in which like numerals represent like parts in the several views.

DESCRIPTION OF THE PREFERRED EMBODIMENTS

Figure 1:
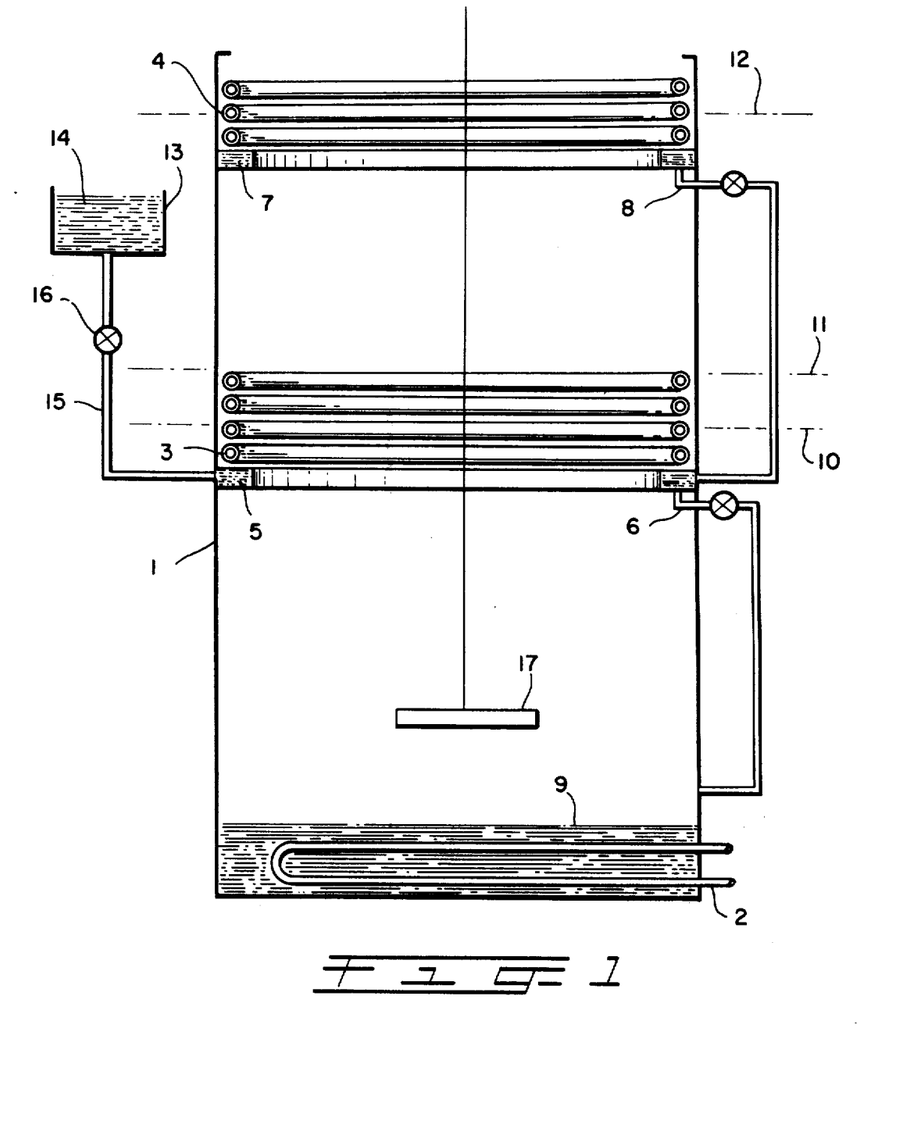
FIG. 1 represents diagrammatically a partially sectional view in elevation of an apparatus for practicing the present invention on a single article or on a batch of articles.

In the embodiment shown in FIG. 1, vessel 1, open to the atmosphere, is provided with heating coil 2, which may be, for example, electrically operated, adjacent the lower end thereof, a primary set of cooling coils 3 intermediate the top and bottom of vessel 1 and receiving circulating cooling medium from a source not shown, and a secondary set of cooling coils 4 adjacent the upper portion of vessel 1 and receiving circulating cooling medium from a source not shown. The secondary set of cooling coils 4 is operated at a lower temperature than the primary set of cooling coils 3.

Heating coil 2 may be supplemented by an external source of heat applied to vessel 1 such as a hot plate (not shown).

Mounted around the inner periphery of vessel 1 immediately below the primary set of cooling coils 3 is a primary trough 5 adapted to receive condensate draining off the said primary set of cooling coils 3 and to discharge the said condensate into valved line 6 communicating with the lower portion of vessel 1.

Mounted around the inner periphery of vessel 1 immediately below the secondary set of cooling coils 4 is a secondary trough 7 adapted to receive condensate draining off the said secondary set of cooling coils 4 and to discharge the said condensate into valved line 8 communicating with the primary trough 5.

A mixture of two liquids, selected as hereinafter described, is introduced into vessel 1 to a level generally indicated by the numeral 9 and is brought to and maintained at a boil by means of heating coil 2.

One of the two liquids is a primary, heat transfer liquid characterized by the following general properties:
 a. The primary liquid must have a boiling point at atmospheric pressure at least equal to, and preferably slightly above, the temperature required for the soldering (or fusing or brazing) operation; e.g., in a soldering operation, this boiling point is at least equal to, and preferably above, the melting point of the solder used in the operation.
 b. The primary liquid must produce a saturated vapor which, for the embodiments disclosed herein, is denser than air at atmospheric pressure.
 c. The primary liquid desirably has a sharply defined and substantially constant boiling point for better control over the process.
 d. The primary liquid desirably produces a saturated vapor which is non-oxidizing, chemically stable and inert, non-toxic and non-inflammable.

In addition to the general properties hereinabove recited, when the process is employed on an article such as a printed circuit board having mounted thereon for soldering various electrical components, the primary liquid advantageously should not be electrically conducting.

The other of the two liquids is a secondary liquid characterized by the following properties:
 a. The secondary liquid must have a lower boiling point at atmospheric pressure than the primary liquid.
 b. The secondary liquid must produce a vapor which, for the embodiments disclosed herein is, at atmospheric pressure, less dense than saturated vapor from the primary liquid at this pressure and which is denser than air at this pressure and at the same temperature.
 c. The secondary liquid desirably does not form an azeotrope with the primary liquid.
 d. The secondary liquid desirably produces a saturated vapor which does not support a high equilibrium moisture content.
 e. The secondary liquid desirably produces a saturated vapor which is non-oxidizing, chemically stable, non-toxic and non-inflammable.

In addition to the general properties hereinabove receited, when the process is employed on an article such as a printed circuit board having mounted thereon for soldering various electrical components, the secondary liquid should not be electrically conducting.

When the mixture of primary and secondary liquids has been brought to a boil, the lower-boiling, non-azeotrope forming, secondary liquid will boil off first, and the saturated vapors therefrom, hereinafter termed secondary vapors, will fill vessel 1 up to some level, depending upon the quantity of secondary liquid in the liquid mixture. After the secondary liquid has boiled off, the remaining primary liquid will be further heated, by means of heating coil 2, until its boiling point is reached, whereupon the primary liquid will boil and produce hot saturated vapors thereof hereinafter termed primary vapors. The primary vapors being denser than the secondary vapors, as the primary vapors are formed and rise within vessel 1, the lighter secondary vapors will be pushed upwardly in vessel 1 by the said primary vapors. In effect, the secondary vapors will be stably stratified over and float on the primary vapors and provide a vapor blanket thereover. The proportions of primary and secondary liquids in the mixture thereof will be selected and determined by the geometry of vessel 1, the locations of the primary and secondary sets of cooling coils 3 and 4, respectively, in the said vessel 1, and the desired thickness of the layer of secondary vapor over the primary vapor. Specifically, the proportions of primary and secondary liquids in the mixture thereof are chosen so that, at equilibrium after start-up as hereinabove described, there will exist in vessel 1 a body of hot saturated essentially primary vapor, the top of which will be approximately at the level indicated diagrammatically by phantom line 10 extending through the primary set of cooling coils 3; there will also exist a body of a mixture of primary and secondary vapors extending from the level indicated diagrammatically by phantom line 10 up to a level indicated diagrammatically by phantom line 11; there will also exist a body of saturated essentially secondary vapor extending from the level indicated diagrammatically by phantom line 11 up to a level indicated diagrammatically by phantom line 12 extending through the secondary set of cooling coils 4.

The primary set of cooling coils 3 is maintained at a temperature below the condensation temperature of the primary vapor (i.e., below the boiling point of the primary liquid). The secondary set of cooling coils 4 is maintained at a temperature below the condensation temperature of the secondary vapor (i.e., below the boiling point of the secondary liquid).

Condensate draining off the surface of the primary set of cooling coils 3, essentially primary liquid, is collected in primary trough 5 and is returned to the lower portion of vessel 1, above liquid level 9, through line 6.

Condensate draining off the surface of the secondary set of cooling coils 4, essentially secondary liquid, is collected in secondary trough 7 and is returned through line 8 to primary trough 5 wherein it is reboiled and revaporized and returned as secondary vapor to the upper portion of vessel 1. The reboiling occurs because the primary liquid condensate from the primary set of cooling coils 3 is at a temperature above the boiling point of the secondary liquid.

The hot saturated primary vapor is denser than air and will occupy the lower portion of vessel 1 above liquid level 9. The saturated secondary vapor is denser than air but lighter than the primary vapor, under the conditions of operation, and will occupy the upper portion of vessel 1, above the body of hot saturated primary vapor, up to the level indicated diagrammatically by phantom line 12.

It will be seen, therefore, that at no time is there an interface between the body of hot saturated primary vapor and the atmosphere. Rather, the body of saturated secondary vapor acts as a barrier or lid over the body of hot saturated primary vapor, and thereby reduces or substantially eliminates any tendency of the hot saturated primary vapors to escape to the atmosphere. It will be appreciated, then, that if the primary liquid is relatively quite expensive compared to the secondary liquid, the provision of the body of saturated secondary vapor over the body of hot saturated primary vapor, acting to reduce or substantially eliminate losses to the atmosphere of primary vapor, will considerably reduce the cost of operation of a facility embodying condensible fluids to heat articles by condensation thereon. There will, of course, be some loss of secondary vapor to the atmosphere across the secondary vapor-air interface. Where, as hereinbefore stated, the secondary liquid is less expensive than the primary liquid, this loss will not constitute as serious an economic charge against the operation, and may under some circumstances be quite insignificant. To compensate for secondary vapor losses to the atmosphere, a make-up tank 13 containing a supply 14 of makeup secondary liquid is connected through line 15 to primary trough 5. Makeup secondary liquid fed to primary trough 5 is boiled off therefrom by primary liquid condensate. Line 15 is provided with a valve 16 to regulate the flow of makeup secondary liquid to primary trough 5. Valve 16 may be a control valve operated in a manner known to those familiar with the art by sensors detecting a drop in the elevation of the top of the body of secondary vapor or by sensors detecting changes in secondary vapor concentration in the upper portion of vessel 1.

The operation of the embodiment of FIG. 1 will now be described specifically in connection with soldering. After the bodies of primary and secondary vapors have been established in vessel 1, as hereinabove described, an article 17, which may for example be a printed circuit board with electrical components mounted thereon for soldering and with solder preforms or plating as required provided thereon in a known manner, is lower in vessel 1 through the body of secondary vapor into the body of hot saturated primary vapor, below the primary set of cooling coils 3 and is held suspended in this position as shown in FIG. 1. Hot saturated primary vapors will condense on the article 17, giving up latent heat of vaporization to heat the article 17 until the temperature of the article 17 approaches or reaches the temperature of the saturated primary vapor which is the boiling point of the primary heat transfer liquid, and which, as hereinbefore mentioned, is at least equal to, and preferably above, the melting point of the solder used for the operation. The article 17 will approach or reach the temperature of the hot saturated primary vapor fairly rapidly, because heat transfer coefficients for condensation processes are among the highest known for any mode of heat transfer, whereupon the solder will melt or reflow to effect the soldering operation on article 17 (e.g., to effect the soldering of electrical components to a printed circuit board).

The high rate of heat transfer from the condensing hot saturated primary vapor to the article 17, permitting the soldering operation to be completed rapidly, results in an exposure of relatively short duration of the article 17 to the elevated soldering temperature. Where the article 17 is a printed circuit board having electrical components mounted for soldering thereon, this relatively short exposure to the elevated soldering temperatures prevents heat damage to the said printed circuit board and associated electrical components which might otherwise occur under more prolonged exposure to such elevated temperature. With adequate vapor generating capacity of the apparatus (and it will be understood that heating coil 2, and auxiliary heating means such as a hot plate, if employed, are so sized as to be able to maintain the level of hot saturated essentially primary vapor up to approximately the level of phantom line 10 when the article 17 is introduced into such hot saturated essentially primary vapor), soldering times may range between approximately 5 seconds for typical light printed circuit boards and components with low thermal mass to approximately 40 seconds for typical massive printed circuit boards and components with high thermal mass. Primary vapors condensing on the article 17 will drain back to the body of liquid in the lower portion of vessel 1. It will be seen that the primary heat transfer liquid is continuously being distilled, that non-volatile contaminants remain in the body of the liquid at the bottom of vessel 1, and that primary vapors condensing on article 17 are relatively clean. The hot saturated primary vapor, being non-oxidizing, may eliminate in some instances any need for fluxing the article 17. After the solder has melted or reflowed, the article 17 is removed, through the body of secondary vapor blanketing the body of primary vapor, from vessel 1 and cooled to ambient temperature.

Although the operation hereinabove described for FIG. 1 has been based upon soldering one article 17, it will be understood that a batch of articles 17 may be introduced at one time into vessel 1 for simultaneous soldering.

In a specific example wherein article 17 is a printed circuit board, and electrical components are to be soldered thereto with solder melting at 360°F. (182.2°C.), the primary heat transfer liquid advantageously is selected from the group of liquids known generically as fluorocarbons, such as fluorinated polyoxypropylene. Such a liquid is sold by E. I. DuPont de Nemours & Co. under the trademark FREON E5 and has the following significant properties:

Boiling point at atmopsheric pressure 435.6°F. (224.2°C.)
Electrical resistivity--greater than $4 \times 10^{14}$ ohm-cm.
Dielectric constant—2.45
Latent heat of vaporization—19.9 BTU/lbs.
Density of saturated vapor at boiling point and atmospheric pressure—1.45 lbs./ft.$^3$
Chemical stability, inertness, non-toxicity, non-flammability.

Another suitable primary heat transfer liquid is sold by E. I. DuPont de Nemours & Co. under the trademark FREON E4 and has the following significant properties:

Boiling point at atmospheric pressure— 380.8°F. (193.8°C.)
Electrical resistivity—greater than $4 \times 10^{14}$ ohm-cm.
Dielectric constant—2.50
Latent heat of vaporization—22.5 BTU/NO.
Density of saturated vapor at boiling point and atmospheric pressure—1.40 lbs./ft.$^3$
Chemical stability, inertness, non-toxicity, non-flammability.

A suitable secondary liquid adapted for use in the manner hereinbefore described with either FREON E5 or FREON E4 as the primary heat transfer liquid advantageously is selected from the group of liquids known generically as halogenated hydrocarbons such as trichloro-trifluoro-ethane. Such a liquid is sold by E. I. DuPont de Nemours & Co. under the trademark "FREON TF" and has the following significant properties:

Boiling point at atmospheric pressure— 117.6°F. (47.6°C.)
Electrical resistivity—greater than $2 \times 10^{15}$ ohm-cm.
Dielectric constant—2.41
Latent heat of vaporization—63.12 BTU/lbs.
Density of saturated vapor at boiling point and atmospheric pressure—0.461 lbs./ft.$^3$
Substantial chemical stability, very low toxicity, non-flammability.

The apparatus shown in FIG. 1 was successfully operated, employed FREON E5 as the primary liquid and FREON TF as the secondary liquid, FREON TF constituting 5% by volume of the mixture of the two liquids. The primary set of cooling coils was operated at approximately 80°F. (26.7°C.) and the secondary set of cooling coils at approximately 40°F. (4.4°C.).

It will be understood that the embodiment of FIG. 1 can, without modification, be used to effect solder fusing on a board. The board with the solder coating to be fused is fluxed and then simply lowered through the blanket of secondary vapor into the hot saturated primary vapor and held there until heated by condensation thereon of primary vapor, the solder coating fusing at the temperature of the primary vapor. Thereafter, the board with the fused solder thereon is withdrawn from the primary vapor through the blanket of secondary vapor into the atmosphere and there allowed to cool to ambient temperature.

It will be further understood that the embodiment of FIG. 1 can, without modification other than in selecting suitable primary and secondary liquids, be used for brazing, the primary liquid being chosen with a boiling point at atmospheric pressure at least equal to, and preferably above, brazing temperature. The parts to be brazed are lowered through the blanket of secondary vapor into the hot saturated primary vapor and held there until heated by condensation thereon of primary vapor, brazing then occurring. Thereafter, the brazed articles are withdrawn from the primary vapor through the blanket of secondary vapor into the atmosphere and there allowed to cool to ambient temperature.

Figure 2:
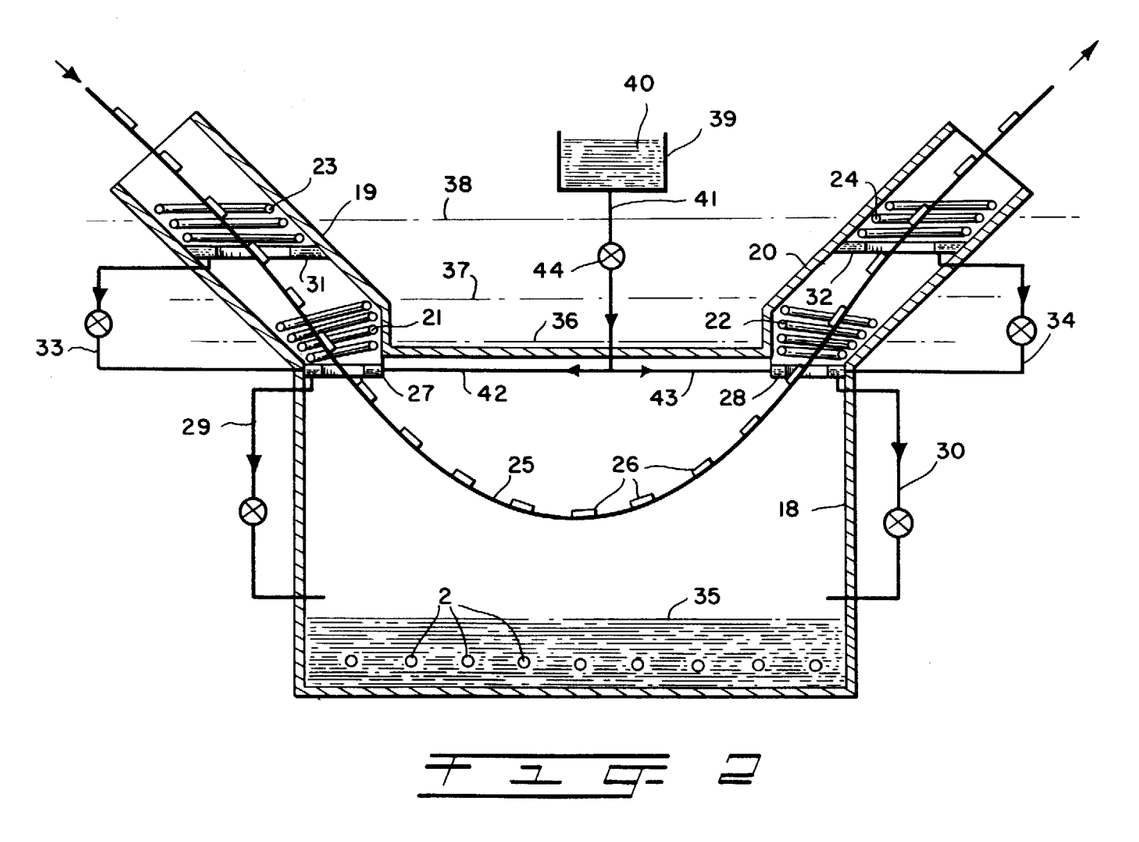
FIG. 2 represents diagrammatically a partially sectional view in elevation of apparatus for practicing the present invention on a continuously moving line of articles.

In the embodiment of FIG. 2, vessel 18 is provided with inlet and outlet conduits 19 and 20 at opposite ends thereof. Primary sets of cooling coils 21 and 22 are provided in conduits 19 and 20, respectively, as shown, and receive circulating cooling medium from a source not shown. Secondary sets of cooling coils 23 and 24 are also provided in conduits 19 and 20, respectively, as shown, also receiving cooling medium from a source, not shown, and are operated at a temperature below that of the primary sets of cooling coils 21 and 22. Conveyor means 25, adapted to carry articles 26 to be soldered, fused or brazed, extends through the secondary set of cooling coils 23 and the primary set of cooling coils 21 in inlet conduit 19 into vessel 18 and out through the primary set of cooling coils 22 and the secondary set of cooling coils 24 in outlet conduit 20. Driving means, not shown, are provided to continuously move conveyor means 25 into and out of vessel 18 in the direction indicated by the arrows, and conventional guide means, not shown, are provided to guide conveyor means 25 in the desired path.

Mounted in vessel 18 below the primary sets of cooling coils 21 and 22 are annular primary troughs 27 and 28, respectively, adapted to receive condensate draining off the said primary sets of cooling coils 21 and 22 and to discharge said condensate into valved lines 29 and 30, respectively, communicating with the lower portion of vessel 18.

Mounted about the inner perpheries of inlet and outlet conduits 19 and 20 below the secondary sets of cooling coils 23 and 24 are secondary troughs 31 and 32, respectively, adapted to receive condensate draining off the said secondary sets of coiling coils 23 and 24 and to discharge the said condensate into valved lines 33 and 34 communicating, respectively, with primary troughs 27 and 28.

In operating the embodiment of FIG. 2, a mixture of primary and secondary liquids, selected according to the criteria and desiderata previously enumerated in connection with the embodiment of FIG. 1, is introduced into vessel 18 up to the level generally indicated by numeral 35, and is brought to and maintained at a boil by means of heating coils 2. In such manner, a body of hot, saturated essentially primary vapor is established in vessel 18 up to a level diagrammatically represented by phantom line 36 which extends through the primary sets of cooling coils 21 and 22, a mixture of primary and secondary vapors is established in vessel 18 from the level of phantom line 36 up to a level diagrammatically represented by phantom line 37, and a blanketing body of essentially secondary vapor is established in vessel 18 from the level of phantom line 37 up to a level diagrammatically represented by phantom line 38 which extends through the secondary sets of cooling coils 23 and 24. The primary sets of cooling coils 21 and 22 are maintained at a temperature below the condensation temperature of the primary vapor (i.e., below the boiling point of the primary liquid). The secondary sets of cooling coils 23 and 24 are maintained at a temperature below the condensation temperature of the secondary vapor (i.e., below the boiling point of the secondary liquid). Condensate draining off the surfaces of the primary sets of cooling coils 21 and 22, essentially primary liquid, is collected in primary troughs 27 and 28 and is returned through lines 29 and 30, respectively, to the lower portion of vessel 18, above liquid level 35. Condensate draining off the surfaces of the secondary sets of cooling coils 23 and 24, essentially secondary liquid, is collected in secondary troughs 31 and 32 and is returned through lines 33 and 34, respectively, to primary troughs 27 and 28 wherein it is reboiled and revaporized and returned as secondary vapor to the upper portions of inlet and outlet conduits 19 and 20, respectively. The reboiling occurs because the primary liquid condensate from the primary sets of cooling coils 21 and 22 is at a temperature above the boiling point of the secondary liquid.

Articles 26, at ambient temperature, are placed on conveyor means 25, which is driven in the direction indicated by the arrows. The articles 26 are thus brought through the blanketing layer or body of secondary vapor in inlet conduit 19 into the hot saturated primary vapor in the vessel 18, are heated by condensation thereon of primary vapor to or near the boiling point of the primary liquid whereupon the desired soldering, fusing or brazing operation occurs, after which the articles 26 are carried out of vessel 18 from the body of hot saturated primary vapor through the blanketing body of secondary vapor into the atmosphere in which they are cooled to ambient temperature. The velocity of conveyor means 25 is chosen so that the dwelling time of articles 26 in vessel 18 is sufficient to permit the desired soldering, fusing or brazing operation to take place. The blanketing bodies of secondary vapor in inlet and outlet conduits 19 and 20 reduce or substantially eliminate any losses of primary vapor to the atmosphere. There may be, of course, some loss of secondary vapor to the atmosphere across the secondary vapor-air interface. Where the secondary liquid is much less expensive than the primary liquid, as hereinbefore explained, losses of secondary vapor may not have a substantial adverse effect on the economics of the operation and may indeed have no significant adverse effect on these economics. To compensate for secondary vapor losses to the atmosphere, a makeup tank 39 containing a supply 40 of makeup secondary liquid is connected through header 41 and lines 42 and 43 to primary troughs 27 and 28. Makeup secondary liquid fed to primary troughs 27 and 28 is boiled off therefrom by primary liquid condensate therein. Header 41 is provided with a valve 44 to regulate the flow of makeup secondary liquid to primary troughs 27 and 28. Valve 44 may be a control valve operated in a manner known to those familiar with the art by sensors detecting a drop in the elevation of the top of the body of secondary vapor or by sensors detecting changes in secondary vapor concentration in the upper portion of vessel 18.

If the mixture of liquids in vessel 18 consists of FREON E5 as the primary liquid and FREON TF as the secondary liquid (typically, about 5% by volume of the mixture of liquids will consist of FREON TF) then advantageously the primary sets of cooling coils 21 and 22 will be maintained at approximately 80°F. (26.7°C.) and the secondary sets of cooling coils 23 and 24 will be maintained at approximately 40°F. (4.4°C.)

The embodiment of FIG. 2 is particularly well suited for rapid mass reflow soldering operations on a continuously moving line of printed circuit boards or the like.

Figure 3:
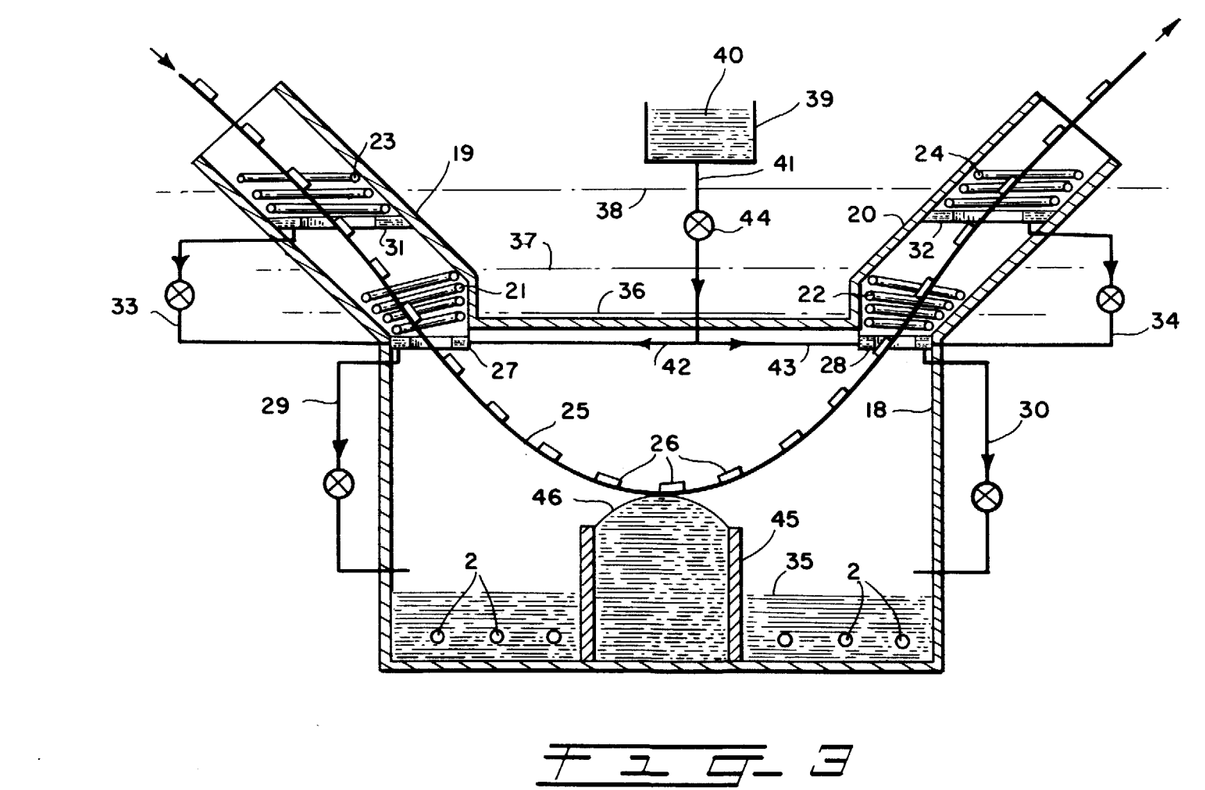
FIG. 3 represents diagrammatically a partially sectional view in elevation of apparatus in which a continuously moving line of articles is wave soldered according to the present invention.
Figure 4:
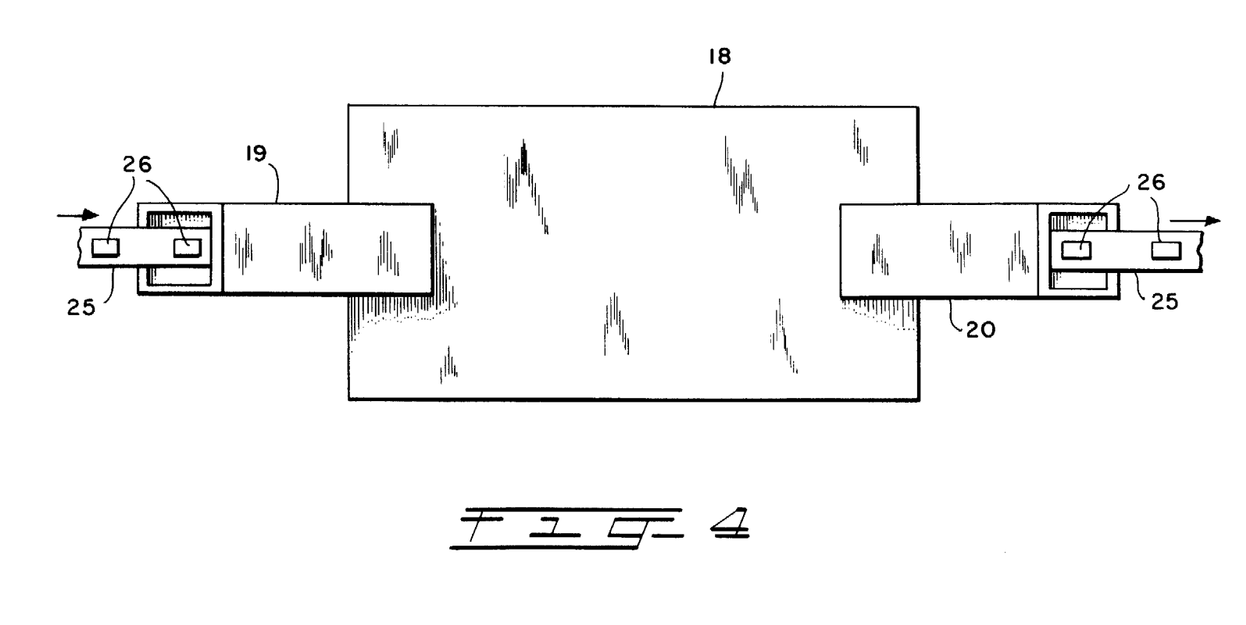
FIG. 4 represents a view in plan of the apparatus of FIGS. 2 and 3.

The embodiment of FIG. 3, which is particularly well suited for mass wave soldering operations on a continuously moving line of printed circuit boards or the like, is similar to that of FIG. 2, with the addition of a wall or weir 45 bounding a conventionally generated solder wave or fountain as indicated diagrammatically. Examples of solder waves or fountains are shown, for example, in U.S. Pat. No. 3,536,243 (1970) to Higgins, U.S. Pat. No. 3,612,388 (1971) to Wegener and U.S. Pat. No. 3,726,465 (1973) to Boynton. It will be understood that in a solder wave or fountain, a wave 46 of molten solder projects upwardly beyond adjacent structure as shown diagrammatically in FIG. 3.

In operating the embodiment of FIG. 3, a wave 46 of molten solder is established and maintained preferably at a temperature above the boiling point of the primary liquid which, in turn, is preferably above the melting point of the solder employed in the operation. Conveyor means 25 is driven in the direction indicated by the arrows, and articles 26 to be wave soldered are placed thereon. Each article 26 enters vessel 18 through inlet conduit 19 at ambient temperature, passing through the blanketing layer or body of secondary vapor into the hot saturated primary vapor, and is then preheated by the latent heat of vaporization of the primary vapor condensing thereon to a temperature in excess of the melting point of the solder used in this operation. This preheating causes any solder coating on the article 26 to melt so as to effect solder fusing which is desirable. The preheated article 26 then enters the wave 46 of molten solder and is soldered therein. It will be seen that the solder wave or fountain 46 is employed to provide molten solder to the article 26 and not heat, which allows better control over the process because the heating and soldering operations are separated. After the article 26 leaves the wave 46, and is still within the body of hot saturated primary vapor, the solder thereon including that supplied by the solder wave or fountain 46 remains molten and thus can flow due to the influence of surface tension thereby to minimize solder defects. The article 26 is carried from vessel 18 out of the body of hot saturated primary vapor through the blanketing layer or body of secondary vapor in outlet conduit 20 into the atmosphere whereupon it cools to ambient temperature, the solder thereon freezing and solidifying.

Alternatively, the primary liquid could be selected with a boiling point lower than the melting point of the solder used in the operation. In operating the embodiment of FIG. 3 with such a primary liquid, the article 26 would be preheated by condensing primary vapor and then further heated to the desired temperature by the solder wave 46 in which wave soldering takes place.

It will be seen from FIGS. 1-4 that the operations hereinabove described are, in the preferred embodiments, conducted in systems open to the atmosphere, and that there is no interface between the body of hot saturated primary vapor and the atmosphere due to the blanketing layer of secondary vapor floating on the hot saturated primary vapor in interposed relationship between the said primary vapor and the atmosphere, whereby losses of primary vapor to the atmosphere are reduced or substantially eliminated.

What is claimed is:

1. Method for performing on an article at elevated temperature an operation comprising the melting of material, said method comprising:
   a. continuously boiling substantially at atmospheric pressure a primary liquid having a boiling point at least equal to the said elevated temperature and the melting point of said material, thereby generating a body of saturated primary vapor of said primary liquid at least at said elevated temperature, said body of saturated primary vapor overlying said primary liquid, the density of said saturated primary vapor being greater than the density of air at ambient temperature and at atmospheric pressure;
   b. generating a body of secondary vapor from a secondary liquid, said secondary liquid having a lower atmospheric boiling point than said primary liquid;
   c. maintaining in interposed relationship between said body of saturated primary vapor and the atmosphere said body of secondary vapor, said body of secondary vapor preventing an interface between said body of saturated primary vapor and the atmosphere, thereby substantially to prevent losses of primary vapor to the atmosphere;
   d. transporting said article from the atmosphere through the body of secondary vapor into the body of saturated primary vapor;
   e. condensing saturated primary vapor directly on said article thereby to heat said article at least to said elevated temperature by transfer of latent heat of vaporization of said condensed saturated primary vapor to said article;
   f. performing said operation on said article;
   g. thereafter, transporting said article from said body of saturated primary vapor through said body of secondary vapor into the atmosphere.

2. Method as in claim 1, wherein:
   h. the density of the secondary vapor is intermediate the density of the saturated primary vapor and the density of air at ambient temperature and at atmospheric pressure,
   i. said body of secondary vapor floats on said body of primary vapor.

3. Method as in claim 1, wherein:
   h. the operation performed on the article is soldering with solder,
   i. the boiling point of said primary liquid is at least equal to the melting point of said solder.

4. Method as in claim 3, wherein the article to be soldered is a printed circuit board having electrical components mounted thereon and wherein:
   j. said primary liquid is electrically non-conductive,
   k. said primary vapor is chemically inert.

5. Method as in claim 1, wherein:
   h. the operation to be performed on the article is fusing a coating of solder thereon,
   i. the boiling point of said primary liquid is at least equal to the melting point of said solder.

6. Method as in claim 1, wherein:
   h. the operation to be performed on the article is brazing,
   i. the boiling point of the primary liquid is at least equal to the melting point of the material being brazed.

7. Method as in claim 1, wherein:
   h. said saturated primary vapor is chemically inert.

8. Method for performing on an article at elevated temperature on operation comprising the melting of material, said method comprising:
   a. establishing substantially at atmospheric pressure a body of saturated primary vapor extending to a first predetermined height over a primary liquid having a boiling point at least equal to said elevated temperature and the melting point of said material by continuously boiling said primary liquid;
   b. applying a first cooling medium to said body of saturated primary vapor at said first predetermined height to condense saturated primary vapor at said first predetermined height;
   c. generating a body of secondary vapor from a secondary liquid, said secondary liquid having a lower atmospheric boiling point than said primary liquid;
   d. maintaining said body of secondary vapor floating on said body of saturated primary vapor, said body of secondary vapor preventing an interface between said body of saturated primary vapor and the atmosphere thereby substantially to prevent losses of primary vapor to the atmosphere;
   e. applying a second cooling medium to said body of secondary vapor at a second predetermined height over said first predetermined height to condense secondary vapor at said second predetermined height and to restrict said secondary vapor from rising above said second predetermined height;
   f. transporting said article from the atmosphere through the body of secondary vapor into the body of saturated primary vapor below said first predetermined height;
   g. condensing saturated primary vapor directly on said article thereby to heat said article at least to said elevated temperature by transfer of latent heat of vaporization of said condensed saturated primary vapor to said article;
   h. performing said operation on said article;
   i. thereafter, transporting said article from said body of saturated primary vapor through said body of secondary vapor into the atmosphere.

9. Method as in claim 8, further comprising:
   j. returning to said primary liquid condensed primary vapors resulting from steps (b) and (g).

10. Method as in claim 8, wherein:
j. the temperature of said second cooling medium is lower than the temperature of said first cooling medium;

said method further comprising:
k. collecting condensed secondary vapor resulting from step (e) and contacting said condensed secondary vapor with condensed primary vapor resulting from step (b), thereby to reboil and revaporize said condensed secondary vapor.

11. Method as in claim 8, wherein:
j. the operation performed on the article is soldering with solder,
k. the boiling point of the primary liquid is at least equal to the melting point of said solder.

12. Method as in claim 11, wherein the article to be soldered is a printed circuit board having electrical components mounted thereon and wherein:
l. said primary liquid is electrically non-conductive,
m. said primary vapor is chemically inert.

13. Method as in claim 8, wherein:
j. the operation performed on the article is fusing a coating of solder thereon,
k. the boiling point of the primary liquid is at least equal to the melting point of said solder.

14. Method as in claim 8, wherein:
j. the operation to be performed on the article is brazing,
k. the boiling point of said primary liquid is at least equal to the melting point of the material being brazed.

15. Method as in claim 8, wherein:
j. said saturated primary vapor is chemically inert.

16. Method as in claim 8, wherein:
j. said saturated primary vapor is denser than air at ambient temperature and atmospheric pressure,
k. said seondary vapor has a density intermediate the density of the saturated primary vapor and the density of air at ambient temperature and atmospheric pressure.

17. Wave soldering an article according to the method of claim 8, further comprising:
j. generating a solder wave extending into said body of saturated primary vapor below said first predetermined height,
k. passing said article through said solder wave.

18. Method according to claim 17, wherein:
i. the temperature of said solder wave is higher than the temperature of said body of saturated primary vapor.

19. Apparatus for heating an article to an elevated temperature, said apparatus comprising:
a. a vessel open to the atmosphere and adapted to contain a primary liquid having a boiling point at least equal to said elevated temperature,
b. heating means adjacent the lower end of said vessel and adapted to boil said primary liquid to produce primary vapor therefrom,
c. primary condensing means at a first elevation above the bottom of said vessel and adapted to condense primary vapor to primary liquid at said first elevation,
d. primary condensate collecting means associated with said primary condensing means and adapted to collect condensed primary vapor therefrom,
e. a first conduit communicating between said primary condensate collecting means and the lower portion of said vessel and adapted to convey condensed primary vapor from said primary condensate collecting means to the lower portion of said vessel,
f. means to establish a body of secondary vapor in said vessel above said primary vapor,
g. secondary condensing means at a second elevation above said first elevation and adapted to condense secondary vapor to secondary liquid at said second elevation,
h. secondary condensate collecting means associated with said secondary condensing means and adapted to collect condensed secondary vapor therefrom,
i. a second conduit communicating between said secondary condensate collecting means and said primary condensate collecting means and adapted to convey condensed secondary vapor from said secondary condensate collecting means to said primary condensate collecting means,
j. a secondary liquid supply tank adapted to contain secondary liquid,
k. a third conduit communicating between said secondary liquid supply tank and said primary condensate collecting means and adapted to convey secondary liquid from said secondary liquid supply tank to said primary condensate collecting means.

20. Apparatus as in claim 19, further comprising:
l. valve means mounted in said third conduit and adapted to control the flow of secondary liquid from said secondary liquid supply tank through said third conduit into said primary condensate collecting means in response to the quantity of secondary vapor in said vessel.

21. Method for heating an article to an elevated temperature and performing an operation on said article, said method comprising:
a. continuously boiling substantially at atmospheric pressure a primary liquid having a boiling point at least equal to the said elevated temperature thereby generating a body of saturated primary vapor of said primary liquid at least at said elevated temperature, said body of saturated primary vapor overlying said primary liquid, the density of said saturated primary vapor being greater than the density of air at ambient temperature and at atmospheric pressure;
b. generating a body of secondary vapor from a secondary liquid, said secondary liquid having a lower atmospheric boiling point than said primary liquid;
c. maintaining in interposed relationship between said body of saturated primary vapor and the atmosphere said body of secondary vapor, said body of secondary vapor preventing an interface between said body of saturated primary vapor and the atmosphere, thereby substantially to prevent losses of primary vapor to the atmosphere;
d. transporting said article from the atmosphere through the body of secondary vapor into the body of saturated primary vapor;
e. condensing saturated primary vapor directly on said article thereby to heat said article at least to said elevated temperature by transfer of latent heat of vaporization of said condensed saturated primary vapor to said article;
f. performing said operation on said article;

g. thereafter, transporting said article from said body of saturated primary vapor through said body of secondary vapor into the atmosphere.

22. Method as in claim 21, wherein:
   h. the density of the secondary vapor is intermediate the density of the saturated primary vapor and the density of air at ambient temperature and at atmospheric pressure,
   i. said body of secondary vapor floats on said body of primary vapor.

23. Method as in claim 21, wherein:
   h. the operation performed on the article is wave soldering.

24. Method for heating an article to an elevated temperature and performing an operation on said article, said method comprising:
   a. establishing substantially at atmospheric pressure a body of saturated primary vapor extending to a first predetermined height over a primary liquid having a boiling point at least equal to said elevated temperature by continuously boiling said primary liquid;
   b. applying a first cooling medium to said body of saturated primary vapor at said first predetermined height to condense saturated primary vapor at said first predetermined height;
   c. generating a body of secondary vapor from a secondary liquid, said secondary liquid having a lower atmospheric boiling point than said primary liquid;
   d. maintaining said body of secondary vapor floating on said body of saturated primary vapor, said body of secondary vapor preventing an interface between said body of saturated primary vapor and the atmosphere thereby substantially to prevent losses of primary vapor to the atmosphere;
   e. applying a second cooling medium to said body of secondary vapor at a second predetermined height over said first predetermined height to condense secondary vapor at said secondary height and to restrict said secondary vapor from rising above said second predetermined height;
   f. transporting said article from the atmosphere through the body of secondary vapor into the body of saturated primary vapor below said first predetermined height;
   g. condensing saturated primary vapor directly on said article thereby to heat on said article at least to said elevated temperature by transfer of latent heat of vaporization of said condensed saturated primary vapor to said article;
   h. performing said operation on said article;
   i. thereafter, transporting said article from said body of saturated primary vapor through said body of secondary vapor into the atmosphere.

25. Method as in claim 24, further comprising:
   j. returning to said primary liquid condensed primary vapors resulting from steps (b) and (g).

26. Method as in claim 24, wherein:
   j. the temperature of said second cooling medium is lower than the temperature of said first cooling medium; said method further comprising:
   k. collecting condensed secondary vapor resulting from step (e) and contacting said condensed secondary vapor with condensed primary vapor resulting from step (b), thereby to reboil and revaporize said condensed secondary vapor.

27. Method as in claim 24, wherein:
   j. said saturated primary vapor is denser than air at ambient temperature and atmospheric pressure,
   k. said secondary vapor has a density intermediate the density of the saturated primary vapor and the density of air at ambient temperature and atmospheric pressure.

28. Method as in claim 24, wherein:
   j. the operation performed on the article is wave soldering.

* * * * *